United States Patent
Sumiya et al.

[11] Patent Number: 5,882,784
[45] Date of Patent: Mar. 16, 1999

[54] METAL-FILM LAMINATE

[75] Inventors: Takashi Sumiya, Gifu; Iwao Tanaka, Hikone; Kunio Shibatsuji, Kusatsu; Hirokazu Kurome, Gifu; Seiya Sugiura, Takatsuki; Wataru Ooe, Otsu, all of Japan

[73] Assignee: Toray Industries, Inc., Japan

[21] Appl. No.: 916,749

[22] Filed: Aug. 19, 1997

Related U.S. Application Data

[63] Continuation of Ser. No. 426,577, Apr. 21, 1995, abandoned.

[30] Foreign Application Priority Data

Dec. 16, 1994 [JP] Japan ................................. 6-334212

[51] Int. Cl.$^6$ ............................. B32B 15/08; B21D 25/00
[52] U.S. Cl. .......................... 428/332; 428/338; 428/339; 428/458; 228/155; 228/903; 156/221
[58] Field of Search ..................... 428/457, 458, 428/332, 338, 339; 72/364; 228/155, 156, 903, 262.2; 156/212, 221

[56] References Cited

U.S. PATENT DOCUMENTS

| | | | |
|---|---|---|---|
| 4,269,321 | 5/1981 | Ichinose et al. | 215/343 |
| 4,539,260 | 9/1985 | Abe et al. | 428/336 |
| 5,075,152 | 12/1991 | Tsukuda et al. | 428/204 |
| 5,240,779 | 8/1993 | Ono et al. | 428/458 |
| 5,272,011 | 12/1993 | Tanaka et al. | 428/418 |
| 5,372,867 | 12/1994 | Hasegawa et al. | 428/141 |

FOREIGN PATENT DOCUMENTS

| | | |
|---|---|---|
| 0 312 304 | 4/1989 | European Pat. Off. . |
| 0 408 042 | 1/1991 | European Pat. Off. . |
| A-SHO 51-111278 | 1/1976 | Japan . |
| A-HEI 2-305827 | 12/1990 | Japan . |
| 3096343 | 4/1991 | Japan . |
| A-HEI 3-110124 | 5/1991 | Japan . |
| 6286055 | 10/1991 | Japan . |
| A-HEI 4-105922 | 4/1992 | Japan . |
| A-HEI 4-117427 | 4/1992 | Japan . |
| 6234188 | 8/1994 | Japan . |
| 06286055 | 10/1994 | Japan . |
| 6285974 | 10/1994 | Japan . |
| 6286091 | 10/1994 | Japan . |
| A-HEI 6-286055 | 10/1994 | Japan . |
| A-HEI 6-286091 | 10/1994 | Japan . |
| 7-117173 | 5/1995 | Japan . |

*Primary Examiner*—John J. Zimmerman
*Assistant Examiner*—Michael LaVilla
*Attorney, Agent, or Firm*—Austin R. Miller

[57] ABSTRACT

A metal-film laminate including a metal plate and a biaxially oriented polyester-group film laminated on the metal plate. The orientation degree of the film is controlled such that, when the thickness of the film is represented by T and the mean orientation degree of the film in the area from the metal-plate side surface to a position of T/2 in the thickness direction of the film is represented by X, the orientation degree of the film in the area from the metal-plate side surface to the position of T/2 is in the range of X±0.5X and an orientation degree of the film at the non-metal-plate side surface is not less than 2X. When the metal-film laminate is processed by drawing etc., an excellent drawing property and an excellent impact resistance of an obtained metal-film laminated product can be achieved.

8 Claims, No Drawings

METAL-FILM LAMINATE

This application is a continuation of Application Ser. No. 08/426,577, filed Apr. 21, 1995 now abandoned.

BACKGROUND OF THE INVENTION

1. Field of the Invention

The present invention relates to a metal-film laminate formed from a metal plate and a biaxially oriented polyester-group film, and more specifically to a metal-film laminate formed from a polyester-group film for use as a laminate with a metal plate which can be processed by drawing, drawing with ironing, folding, bending and so on, particularly a metal-film laminate which can be used for bodies, bottoms and lids of cans such as cans for beverages and foods.

2. Description of the Prior Art

Although generally painting is performed for preventing rusting of metal, methods for obtaining a rust preventive property without using an organic solvent have been developed particularly for cans. For example, the following methods using metal-film laminates have been proposed.

(1) a method for laminating a biaxially oriented polyethylene terephthalate film onto a metal plate via an adhesive layer of a polyester having a low melting point and using the metal-film laminate as a material for manufacturing cans (JP-A-SHO 56-10451, JP-A-HEI 1-192546, etc.)

(2) a method for laminating an amorphous or low-crystallinity aromatic polyester film onto a metal plate and using the metal-film laminate as a material for manufacturing cans (JP-A-HEI 1-192545, JP-A-HEI 2-57339, etc.)

(3) a method for laminating a low-oriented polyethylene terephthalate film onto a metal plate and using the metal-film laminate as a material for manufacturing cans (JP-A-SHO 64-22530, etc.)

However, the method of the above-described (1) is insufficient in forming and processing property, the method of (2) is insufficient in smell preservative property and embrittlement preventive property, and the method of (3) is insufficient in forming and processing property similarly to in the method of (1), respectively. Therefore, these methods are not suitable for practical uses.

SUMMARY OF THE INVENTION

Accordingly, an object of the present invention is to provide a metal-film laminate which is excellent in forming and processing property and smell preservative property and further excellent in impact resistance, and which can practical uses.

To accomplish the above object, a metal-film laminate according to the present invention comprises a metal plate and a biaxially oriented polyester-group film laminated on the metal plate. The orientation degree of the film is controlled such that, when the thickness of the film is represented by "T" and the mean orientation degree of the film in the area from the metal-plate side surface to a position of T/2 in the thickness direction of the film is represented by "X", the orientation degree of the film in the area from the metal-plate side surface to the position of T/2 is in the range of X±0.5X and the orientation degree of the film at the non-metal-plate side surface is not less than 2X.

Thus, by specifying the orientation degree of the polyester-group film in the thickness direction, a metal-film laminate excellent in forming and processing property in drawing, etc., and excellent in smell preservative property and impact resistance can be obtained.

Further, a method for manufacturing a metal-film laminate product according to the present invention comprises the steps of (a) heat bonding a biaxially oriented polyester-group film onto a metal plate for making a metal-film laminate so that the maximum orientation degree of the heat-bonding side of the film becomes "OM1" and the maximum orientation degree of the non-heat-bonding side of the film becomes "OS1" after heat bonding, (b) forming the metal-film laminate in a predetermined form by drawing or drawing with ironing so that the maximum orientation degree of the heat-bonding side of the film becomes "OM2" and the maximum orientation degree of the non-heat-bonding side of the film becomes "OS2" after forming, and (c) heat treating the formed metal-film laminate so that the maximum orientation degree of the heat-bonding side of the film becomes "OM3" and the maximum orientation degree of the non-heat-bonding side of the film becomes "OS3" after heat treating,
wherein:

$0.30 \leq OM1 \leq 0.65$, $0.65 \leq OS1 \leq 1.8$, $OM1+0.02 < OS1$, $0.35 \leq OM2 \leq 1.2$, $0.85 \leq OS2 \leq 2.5$, $OM2+0.05 \leq OS2$, $0.40 \leq OM3 \leq 1.6$, $1.2 \leq OS3 \leq 5.0$, $OM2+0.1 \leq OM3$, $OS2+0.2 \leq OS3$, $OM3+0.10 \leq OS3$.

In this method, the maximum orientation degrees of the heat-bonding side and the non-heat-bonding side of the film are controlled in the respective specified ranges in the respective stages of after heat bonding, after forming and after heat treating. By this control, a metal-film laminate excellent in forming property in drawing or drawing with ironing and a metal-film laminate product excellent in impact resistance and suitable for use of a material for manufacturing cans can be obtained.

DETAILED DESCRIPTION OF THE PREFERRED EMBODIMENTS

Further objects, features, and advantages of the present invention will be understood from the detailed description of the preferred embodiments of the present invention.

The biaxially oriented polyester-group film having a thickness of "T" according to the present invention may be either a single-layer film of a resin "A" or a laminated film of a resin "A" and a resin "B". Resins "A" and "B" are both composed of polyester-group resins, and particularly it is preferred that they are composed of polyester copolymers. Although it is not particularly restricted, typical examples of such copolymers include the following resins. As the acid component of the copolymers, an aromatic dibasic acid such as terephthalic acid, isophthalic acid and naphthalene dicarboxylic acid, an aliphatic dicarboxylic acid such as adipic acid, sebacic acid, azelaic acid and dodecadionic acid, and a cycloaliphatic dicarboxylic acid such as dimer acid and cyclohexane dicarboxylic acid can be mentioned. As the alcohol component of the copolymers, an aliphatic diol such as ethylene glycol, diethylene glycol, butanediol and hexanediol can be employed. Such acid components and alcohol components are used by combining at least one kind of the respective components. For example, as a preferable copolymer, a polyester copolymer containing terephthalic acid of not less than 75 mol % as its acid component and ethylene glycol of not less than 85 mol % as its alcohol component can be raised.

In the present invention, the amount of acetaldehyde in the polyester is preferably not more than 0.3% by weight, more preferably not more than 30 ppm, and further more preferably not more than 10 ppm. Further, the amount of diethylene glycol in the polyester is preferably not more than 1.5% by weight, more preferably not more than 0.85% by weight, and further more preferably not more than 0.65% by weight. By such conditions, the impact resistance of a metal-film laminate to be obtained can be increased. Furthermore, if the amount of carboxylic group in the polyester is not more than 50 eq/t, preferably not more than 40 eq/t, more preferably not more than 30 eq/t, the impact resistance after retorting of a metal-film laminate to be obtained can be increased.

In the present invention, various polymers can be blended to the above-described polyester resin. As the various polymers, for example, polyethylene, polypropylene, a modified polyolefin such as ionomer, polyvinyl alcohol, polycarbonate, acrylic resin, polyimide, polyamide and amide-group copolymer can be employed.

In the present invention, a biaxially oriented polyester-group film is laminated onto a metal plate for making a metal-film laminate. When the thickness of the film is represented by "T" and a mean orientation degree of the film in the area from the metal-plate side surface to a position of T/2 in the thickness direction of the film is represented by "X", an orientation degree of the film in the area from the metal-plate side surface to the position of T/2 must be in the range of X±0.5X. At the same time, an orientation degree of the film at the non-metal-plate side surface must be not less than 2X.

Namely, as viewed in the thickness direction of the film, the orientation degree of the portion of the metal-plate side is controlled to be relatively low and uniform, and the forming and processing property, particularly processing property for deep drawing can be improved. The orientation degree of the portion of the non-metal-plate side is controlled to be much higher as compared with the above-described value, and the impact resistance of the film surface, ultimately the surface of the metal-film laminate can be greatly increased. As a result, a metal-film laminate having both of excellent forming and processing property and impact resistance can be obtained.

As a concrete value of the above-described orientation degree, the orientation degree "2X" is preferred to be not more than 2.5 as a value of orientation degree determined by a Fourier-transformation infrared spectrophotometer (FT-IR).

The biaxially oriented polyester-group film according to the present invention can be formed as a laminated film of a layer of a resin "A" and a layer of a resin "B". When the melting point temperature of the resin "A" is represented by "$T_A$" (°C.) and the melting point temperature of the resin "B" is represented by "$T_B$" (°C.), it is preferred that the "$T_A$" and "$T_B$" satisfies the equation ($T_A-10 \leq T_B \leq T_A-1$) as well as the layer of the resin "B" is bonded to the metal plate. By this, the aforementioned property of orientation degree can be more easily achieved.

The melting point temperature is determined at a heating speed of 10° C./min. using a differential scanning calorimeter (DSC) produced by Perkin Elmer Corporation. The resin "A" may be contained in the resin "B" at a content of less than 50% by weight, preferably less than 20% by weight.

The amount of diethylene glycol of the resin "A" is preferably not more than 1.2% by weight and the amount of carboxylic end group is preferably not more than 50 eq/t. Further, the amount of diethylene glycol and the amount of carboxylic end group of the resin "B" are less than those of the resin "A", respectively, and particularly, they are preferably not more than 0.6% by weight. By such a condition, the impact resistance can be further increased.

In the present invention, various lubricants may be added to the resins "A" and "B". As the kind of the lubricants, either inorganic lubricants or organic lubricants may be available. As the preferred inorganic lubricants, agglomerated silica, spherical silica, alumina, titanium dioxide, calcium carbonate, barium sulfate and zirconia particles can be mentioned. As the organic lubricants, silicone, crosslinked styrene, imide and amide particles can be mentioned. As the mean particle diameter thereof, not more than 2.0 μm, preferably not more than 1.2 μm, more preferably not more than 0.8 μm can be employed. Alternatively, the condition where the resin "A" contains substantially no particles is preferred particularly from the viewpoint of impact resistance. Further, the condition where the center line average height of the surface roughness of the film is not more than 10 nm, preferably not more than 7 nm, is preferred because a similar advantage can be obtained.

Although the method for producing the polyester-group resin according to the present invention is not particularly restricted, in a case where the metal-film laminate is used for cans or containers, a resin synthesized by direct polymerization is preferred from the viewpoint of smell preservative property.

Further, if the amount of aldehyde groups is reduced by a method such as solid phase polymerization, the smell preservative property can be further improved. Antimony and germanium can be employed as the polymerization catalyst, and germanium is more preferred from the viewpoint of smell preservative property. Further, as needed, other additives, for example, anti-oxidant, thermal stabilizer, ultraviolet absorbent, antistatic agent, colorant, pigment or whitening agent may be added.

The thickness of the polyester-group film according to the present invention is preferably in the range of 2 to 150 μm, more preferably in the range of 8 to 60 μm, further more preferably in the range of 12 to 40 μm. Although the thickness ratio between of the layers A and B (ratio of layer B to layer A) may be preferably in the range of 1/50 to 50/1, the range of 1/20 to 1/3 is particularly preferred.

As a typical metal plate laminated with the film according to the present invention, a tin plate, a tin-free steel or an aluminum plate can be raised. The surfaces of these metal plates may be appropriately treated by organic or inorganic treatment.

In the present invention, when the metal-film laminate thus prepared is formed as a metal-film laminated product, for example, a can, it is preferred that the orientation degrees of the film in the respective processes are controlled as follows.

Namely, at the stage after heat bonding of the film to the metal plate, the maximum orientation degree of the heat-bonding side of the film "OM1" and the maximum orientation degree of the non-heat-bonding side of the film "OS1" are controlled so as to satisfy the following equations.

$$0.30 \leq OM1 \leq 0.65,\ 0.65 \leq OS1 \leq 1.8,\ OM1+0.02 < OS1$$

At the stage after forming in a predetermined form by, for example, drawing or drawing with ironing, the maximum orientation degree of the heat-bonding side of the film "OM2" and the maximum orientation degree of the non-heat-bonding side of the film "OS2" are controlled so as to satisfy the following equations.

$$0.35 \leq OM2 \leq 1.2,\ 0.85 \leq OS2 \leq 2.5,\ OM2+0.05 \leq OS2$$

Further, a heat treatment is performed after the forming, and this heat treatment is performed so that the maximum orientation degree of the heat-bonding side of the film "OM3" and the maximum orientation degree of the non-heat-bonding side of the film "OS3" satisfy the following equations.

$$0.40 \leq OM3 \leq 1.6,\ 1.2 \leq OS3 \leq 5.0,\ OM2+0.1 \leq OM3,$$

$OS2+0.2 \leq OS3$, $OM3+0.10 \leq OS3$

Thus, by the maximum orientation degrees at the stages of after heat bonding, after forming and after heat treatment, respectively, a good processing property in drawing or drawing with ironing and a good impact resistance can be both achieved.

Next, a typical method for producing the film and a method for laminating the film onto a metal plate according to the present invention will be explained. However, the present invention is not particularly restricted by the following methods.

After adding a lubricant to a polyester-group resin having a predetermined viscosity (usually, intrinsic viscosity:0.45–1.50) at an appropriate content, the resin is dried to a condition of a moisture content of not more than 400 ppm, preferably not more than 80 ppm. The dried raw material is molten and mixed using an extruder. In a case where an extruder having a vent port is used, the drying may be omitted, and various additives may be added on the way of the extruder. After the molten resin is delivered out from a die in the form of a sheet, the sheet is cooled on a cooling roll. The sheet formed is stretched in the longitudinal direction at a temperature of 60° to 135° C. and a draw ratio of 2.0 to 6.0 times and, and thereafter, the uniaxially oriented film is stretched in the transverse direction at a temperature of 60° to 140° C. and a draw ratio of 2.0 to 6.0 times, and as needed, the biaxially oriented film is heat treated while relaxed. Particularly, by cooling the film surface immediately before the longitudinal stretching (for example, by cooling using cooling air), the orientation degree of the film surface portion in the longitudinal direction (film flowing direction) can be increased.

The biaxially oriented polyester-group film thus prepared is laminated onto a metal plate prepared as a substrate, for example, a tin-free steel plate. With respect to the condition of the lamination, for example, the metal plate is heated at a temperature of 200° to 300° C., the lamination surface of the film is heated by a heating roller at a temperature of 50° to 150° C., and the heated film is laminated (heat bonded) onto the heated metal plate. Thereafter, if the non-heat-bonding side surface of the film is cooled by a cooling roller at a temperature of 15° to 140° C., the orientation degree of the non-heat-bonding side surface of the film can be further increased. Alternatively, a difference between the orientation degrees of both surfaces of the film (for example, a surface of a resin "A" and a surface of a resin "B") can be provided by providing a temperature difference between at least one roller touching one surface of the film and at least one roller touching the other surface of the film before stretching.

Although the method for controlling the maximum orientation degrees after forming is not particularly restricted, because the maximum orientation degrees are affected by a forming speed, forming pressure and an atmosphere temperature at the time of forming, the maximum orientation degrees may be controlled within the range specified by the present invention in consideration of these conditions.

Although the heat treatment after forming also is not particularly restricted, in order to adequately control the maximum orientation degrees within the specified ranges, for example, a method for heat treating the film at a temperature of 150° to 225° C., preferably at two stages, for a period of time of not more than 5 minutes, preferably not more than 2 minutes, is desired. This heat treatment is preferably performed after being left in an atmosphere at a humidity of about 40% RH for about 30 minutes.

Furthermore, although the maximum orientation degrees after the heat treatment depend basically upon the conditions of the above-described temperature and time of the heat treatment, because the conditions of the film before starting of the heat treatment, that is, the maximum orientation degrees of the heat-bonding side surface and the non-heat-bonding side surface of the film after forming (that is, initial conditions of the heat treatment) become factors affecting the maximum orientation degrees after the heat treatment, the temperature and time of the heat treatment may be decided in consideration of these initial conditions.

Next, the methods for determining the characteristics in the present invention and estimating the effects according to the present invention will be explained.

(1) Orientation degree:

The following Fourier-transformation infrared spectrophotometer (FT-IR) was used.

| | |
|---|---|
| Measuring apparatus | FTS-15E/D (FT-IR produced by Bio Rad Digilab Corporation) |
| Light source | special ceramic detector "MCT" |
| Attached apparatus | Micro-ATR measuring attachment (produced by WILKS Corporation) incident angle: 40 degrees IRE: KRS-5, using a polarizer |
| Measuring conditions | resolution: 4 cm$^{-1}$ cumulative times: 500 times |

The ratio of absorption degrees (970 cm$^{-1}$/790 cm$^{-1}$) of υ C—O transband and benzene ring was determined and this was defined as the orientation degree. As to the orientation degree at a central position in the thickness direction, the film was shaved by a grindstone, and after the position being determined was recognized to be a central position by determining the thickness of the shaved film, the orientation degree was determined in a similar manner.

(2) melting point temperature:

Using a differential scanning calorimeter (DSC) produced by Perkin Elmer Corporation, the melting point temperature was determined under a condition of a heating speed of 10° C./min. and an amount of sample of 10 mg.

(3) Amount of diethylene glycol:

Using nitrogen gas as a carrier gas, a sample of 0.5 g was dissolved into monoethanol amine, and the amount of diethylene glycol was determined from the area ratio in internal standard method using gas chromatography.

(4) Amount of carboxylic end group:

Using "Hiranuma Comtite-7 Reporting Titrator" and using a silver chloride composite electrode, super-saturated potassium chloride solution was filled in the apparatus, and the amount of carboxylic end group was determined based on the following equation.

$$COOH\ (eq/t) = [(A-B) \times C \times F]/S$$

A: amount of titration of NaOH relative to the sample (ml) (normality=N/50–NaOH/methanol)
B: amount of titration of NaOH relative to a blank (ml)
C: 20 (20=N/50×1/1000×10°)
F: factor (determined by benzoic acid/methanol solution)
S: amount of sample (g)

(5) Deep drawing property (Method A):

After a film was laminated onto a heated tin-free steel, the laminate was cooled by a cooling roller from the film side, and thereafter, the laminate was cooled by water. After the metal-film laminate thus prepared was cut as a circular plate having a diameter of 250 mm, the laminate was formed as a can by drawing using a hot forming machine so that the film surface formed an inner surface, at two stage and at a temperature of 85° C. and a draw ratio of 1.30. With respect to the can thus prepared, determination by observation and test on rust preventive property were performed. In the test on rust preventive property, 1% NaCl water was poured in the can, the can was set as an anode and a cathode was entered into the NaCl water, and the property was determined by a value of an electric current when a voltage of 6V was applied. If there was no abnormality on appearance and the electric current was not more than 0.25 mA, it was determined to be rank "◯", and the other conditions were determined to be rank "X".

(6) Deep drawing property (Method B):

After a film was laminated onto a heated tin-free steel, the laminate was cooled by a cooling roller from the film side, and thereafter, the laminate was cooled by water. After the metal-film laminate thus prepared was cut as a circular plate having a diameter of 250 mm, the laminate was formed as a can by drawing using a hot forming machine so that the film surface formed an inner surface, at two stage and at a temperature of 110° C. and a draw ratio of 1.38 (only in Comparative Example 3, at two stages and at a temperature of 105° C. and a draw ratio of 1.41). With respect to the can thus prepared, determination by observation and a test on rust preventive property were performed. In the test on rust preventive property, 1% NaCl water was poured in the can, the can was set as an anode, a cathode was entered into the NaCl water, and the property was determined by a value of an electric current when a voltage of 6V was applied. If there was no abnormality on appearance and the electric current was not more than 0.25 mA, it was determined to be rank "◯", and the other conditions were determined to be rank "X". (7) Impact resistance (Method A):

After the cans drawn and prepared in the above-described item (5) were filled with water, the cans were closed. The cans before treatment, the cans after retorting at a temperature of 115° C. for one hour and the cans after dry-heat treatment at a temperature of 218° C. for ten minutes were determined by 50 pieces, respectively, by a test wherein each can was dropped on a floor inclined at an angle of 15 degrees relative to horizontal plane from a position of a height of 1.2 m, and thereafter, the rust preventive properties were determined in a condition described in the above item (5).

All the cans were in the range of not more than 0.25 mA and the mean value thereof was not more than 0.10 mA: Rank "◉"

All the cans were in the range of not more than 0.25 mA: Δ Rank "◯"

Eight or more cans were in the range of not more than 0.25 mA: Δ Rank "Δ"

The others: Δ Rank "X"

Ranks "◉", "◯" and "Δ" were determined to be able to be served to practical uses.

(8) Impact resistance (Method B):

After 50 cans drawn and prepared in the above-described item (5) were heat treated in a predetermined condition, the cans were filled with water and closed. 50 cans thus prepared and 50 cans after retorting at a temperature of 120° C. for one hour were determined, respectively, by a test wherein each can was dropped on a floor inclined at an angle of 15 degrees relative to horizontal plane from a position of a height of 1.0 m, and thereafter, the rust preventive properties were determined in a condition described in the above item (5).

All the cans were in the range of not more than 0.10 mA: Δ Rank "◉"

All the cans were in the range of not more than 0.25 mA: Δ Rank "◯"

The others: Δ Rank "X"

Ranks "◉" and "◯" were determined to be able to be served to practical uses.

(9) Smell preservative property:

Orange juice and coffee were enclosed in each prepared can, and being left for one week, the smells thereof were determined.

The smells could be detected as the same as those before being enclosed: Δ Rank "◯"

The smells were detected as slightly deteriorated smells: Δ Rank "Δ"

The smells were detected as greatly deteriorated smells: Δ Rank "X"

EXAMPLES AND COMPARATIVE EXAMPLES

Preferred examples will be hereinafter explained together with comparative examples. The results of these examples and comparative examples are shown in Tables 1 to 4.

Example 1

As the resin "A", a polyester (intrinsic viscosity (IV): 0.72) whose acid component was composed of terephthalic acid (TPA) and isophthalic acid (IPA) and whose alcohol component was composed of ethylene glycol (EG) and diethylene glycol (DEG) and to which agglomerated silica particles having a mean particle diameter of 0.6 $\mu$m were added at a content of 0.10% by weight was used. As the resin "B", a polyester (intrinsic viscosity (IV):0.72) whose acid component was composed of terephthalic acid (TPA) and isophthalic acid (IPA) and whose alcohol component was composed of ethylene glycol (EG) and diethylene glycol (DEG) and to which agglomerated silica particles having a mean particle diameter of 1.8 $\mu$m were added at a content of 0.10% by weight and agglomerated silica particles having a mean particle diameter of 0.6 $\mu$m were added at a content of 0.10% by weight was used.

The resin "A" was supplied to an extruder and melted at 280° C., and the molten resin was delivered out from a die in the form of a single-layer sheet to be cast on a cooling roller. Or, the resin "A" and the resin "B" were supplied to extruders different from each other and melted, respectively, and the molten resins were laminated in a die for two-layer lamination, and the laminated sheet was delivered out from the die and cast on a cooling roller. The non-stretched sheet thus formed was stretched in the longitudinal direction at a stretching temperature of 102° C. and a draw ratio of 3.0 times. The temperatures of two rollers present immediately before the longitudinal stretching were controlled at 105° C. and 106° C., respectively. The uniaxially stretched film thus prepared was introduced into a tenter, and the film was stretched in the transverse direction at a stretching temperature of 110° C. and a draw ratio of 3.1 times. After the biaxially stretched film was cooled, the film was heat set at a temperature of 187° C. while relaxed at 1.0% in the transverse direction and 1.2% in the longitudinal direction.

The biaxially oriented film thus prepared was laminated onto a metal plate of a tin-free steel. The characteristics of the film and the metal-film laminate are shown in Tables 1 and 2.

The metal-film laminate was processed in the form of a can by deep drawing under the conditions shown in Table 4 and so that the respective maximum orientation degrees were controlled to the values shown in Table 3. The characteristics of the metal-film laminated product are shown in Table 3.

Examples 2–7, Comparative Examples 1–3

Conditions were changed as shown in Tables 1, 3 and 4. The characteristics of the films prepared, the metal-film laminates obtained and the metal-film laminated products obtained are shown in Tables 1 to 3.

As shown in Tables 1 to 4, the films, the metal-film laminates and the metal-film laminated products within the ranges according to the present invention indicated excellent drawing properties, impact resistances and smell preservative properties, but those out of the ranges specified by the present invention did not exhibit such excellent properties, particularly deep drawing property and impact resistance could not be satisfied.

TABLE 1

| | Resin A | | | | Resin B | | | | Lamination |
|---|---|---|---|---|---|---|---|---|---|
| | —COOH end group (eq/t) | acid component (mol %) | alcohol component (mol %) | $T_A$ (°C.) | —COOH end group (eq/t) | acid component (mol %) | alcohol component (mol %) | $T_B$ (°C.) | thickness A/B (μm) |
| Comparative Example 1 | 44 | TPA: 88 IPA: 12 | EG: 98.9 DEG: 1.1 | 228 | | none | | | 25/0 |
| Example 1 | 44 | TPA: 88 IPA: 12 | EG: 98.9 DEG: 1.1 | 228 | | none | | | 25/0 |
| Example 2 | 44 | TPA: 88 IPA: 12 | EG: 98.9 DEG: 1.1 | 228 | | none | | | 25/0 |
| Example 3 | 44 | TPA: 88 IPA: 12 | EG: 98.9 DEG: 1.1 | 228 | | none | | | 25/0 |
| Comparative Example 2 | 44 | TPA: 88 IPA: 12 | EG: 98.9 DEG: 1.1 | 228 | | none | | | 25/0 |
| Example 4 | 44 | TPA: 88 IPA: 12 | EG: 98.9 DEG: 1.1 | 228 | 42 | TPA: 86 IPA: 14 | EG: 99.5 DEG: 0.5 | 223 | 20/5 |
| Example 5 | 44 | TPA: 88 IPA: 12 | EG: 98.9 DEG: 1.1 | 228 | 42 | TPA: 86 IPA: 14 | EG: 99.5 DEG: 0.5 | 223 | 20/5 |
| Example 6 | 44 | TPA: 88 IPA: 12 | EG: 98.9 DEG: 1.1 | 228 | 42 | TPA: 86 IPA: 14 (10% polycarbonate blended) | EG: 99.5 DEG: 0.5 | 223 | 20/5 |
| Example 7 | 28 | TPA: 88 IPA: 12 | EG: 98.9 DEG: 1.1 | 228 | | none | | | 25/0 |
| Comparative Example 3 | 44 | TPA: 88 IPA: 12 | EG: 98.9 DEG: 1.1 | 228 | | none | | | 25/0 |

| | | Orientation degree | | |
|---|---|---|---|---|
| | x | minimum of x at 0 − T/2 | maximum of x at 0 − T/2 | non-metal side surface |
| Comparative Example 1 | 0.38 | 0.33 | 0.45 | 0.45 |
| Example 1 | 0.45 | 0.32 | 0.60 | 0.91 |
| Example 2 | 0.38 | 0.34 | 0.42 | 1.5 |
| Example 3 | 0.49 | 0.35 | 0.71 | 1.75 |
| Comparative Example 2 | 0.60 | 0.33 | 1.02 | 1.6 |
| Example 4 | 0.36 | 0.32 | 0.40 | 1.1 |
| Example 5 | 0.36 | 0.32 | 0.40 | 1.5 |
| Example 6 | 0.40 | 0.35 | 0.44 | 0.91 |
| Example 7 | 0.40 | 0.35 | 0.44 | 0.92 |
| Comparative Example 3 | 0.48 | 0.37 | 0.66 | 2.10 |

TABLE 2

| | Deep drawing property (Method A) | Impact resistance (Method A) | | Smell preservative property |
|---|---|---|---|---|
| | | before treatment | after treatment | |
| Comparative Example 1 | ○ | Δ | x | ○ |
| Example 1 | ○ | ○ | ○ | ○ |
| Example 2 | ○ | ○ | ○ | ○ |
| Example 3 | ○ | ○ | ○ | ○ |
| Comparative Example 2 | x | x | x | ○ |
| Example 4 | ○ | ○ | ⊚ | ○ |
| Example 5 | ○ | ○ | ⊚ | ○ |
| Example 6 | ○ | ○ | ○ | ○ |
| Example 7 | ○ | ○ | ○ | ○ |
| Comparative Example 3 | ○ | ○ | ○ | ○ |

TABLE 3

|  | OM1 | OS1 | OM2 | OS2 | OM3 | OS3 | Deep drawing property (Method B) | Impact resistance (Method B) | Heat treatment first stage | Heat treatment second stage | Amount of acetaldehyde (ppm) |
|---|---|---|---|---|---|---|---|---|---|---|---|
| Comparative Example 1 | 0.35 | 0.49 | 0.85 | 1.05 | 1.51 | 1.70 | ○ | x | 150° C., 1 min. | 220° C., 1 min | 6 |
| Example 1 | 0.35 | 0.78 | 0.86 | 1.85 | 1.52 | 2.25 | ○ | ○ | 150° C., 1 min | 215° C., 1 min | 8 |
| Example 2 | 0.38 | 1.58 | 0.88 | 2.26 | 1.55 | 4.03 | ○ | ⊙ | 150° C., 1 min | 220° C., 1 min | 6 |
| Example 3 | 0.36 | 1.78 | 0.83 | 2.30 | 1.51 | 4.10 | ○ | ○ | 150° C., 1 min | 220° C., 1 min | 6 |
| Comparative Example 2 | 0.51 | 1.70 | 0.90 | 2.0 | 1.61 | 2.14 | ○ | x | 150° C., 1 min | 215° C., 1 min | 7 |
| Example 4 | 0.35 | 1.16 | 0.84 | 1.93 | 1.50 | 2.31 | ○ | ○ | 150° C., 1 min | 215° C., 1 min | 6 |
| Example 5 | 0.35 | 1.65 | 0.83 | 1.91 | 1.51 | 2.30 | ○ | ⊙ | 150° C., 1 min | 215° C., 1 min | 6 |
| Example 6 | 0.44 | 0.77 | 1.0 | 1.90 | 1.56 | 2.28 | ○ | ○ | 150° C., 1 min | 215° C., 1 min | 6 |
| Example 7 | 0.45 | 0.76 | 1.0 | 1.91 | 1.57 | 2.28 | ○ | ○ | 150° C., 1 min | 215° C., 1 min | 4 |
| Comparative Example 3 | 0.44 | 2.20 | 0.77 | 2.80 | 1.51 | 5.11 | x | x | 150° C., 1 min | 220° C., 1 min | 6 |

TABLE 4

|  | Temperature of metal plate (°C.) | Cooling temperature (°C.) | Time until cooling (second) |
|---|---|---|---|
| Comparative Example 1 | 240 | 60 | 3 |
| Example 1 | 240 | 50 | 2 |
| Example 2 | 245 | 40 | 1.1 |
| Example 3 | 255 | 30 | 0.5 |
| Comparative Example 2 | 228 | 50 | 1.3 |
| Example 4 | 243 | 40 | 1.3 |
| Example 5 | 243 | 40 | 1.1 |
| Example 6 | 240 | 50 | 2 |
| Example 7 | 240 | 50 | 2 |
| Comparative Example 3 | 240 | 18 | 0.9 |

Although several preferred embodiments of the present invention have been described in detail herein, the invention is not limited thereto. It will be appreciated by those skilled in the art that various modifications may be made without materially departing from the novel and advantageous teachings of the invention. Accordingly, the embodiments disclosed herein are by way of example. It is to be understood that the scope of the invention is not to be limited thereby, but is to be determined by the claims which follow.

What is claimed is:

1. A metal-film laminate comprising:
   a metal plate; and
   a biaxially oriented polyester film having a thickness T laminated on said metal plate, an orientation degree of said film after lamination being controlled such that, when a mean orientation degree of said film in the area from the metal-plate side surface to a position of T/2 in the thickness direction of said film is represented by X, wherein the entire range of orientation degrees from the metal plate side surface to said position of T/2 is in the range of X+0.5X and an orientation degree of said film at the non-metal-plate side surface is not less than 2X.

2. The metal-film laminate according to claim 1, wherein 2X is not more than 2.5 as determined by a Fourier-transformation infrared spectrophotometer.

3. The metal-film laminate according to claim 1, wherein said film is a laminate film comprising a layer of a resin A having a melting point temperature $T_A$ (°C.) and a layer of a resin B having a melting point temperature $T_B$ (°C.), said layer of said resin B is bonded to said metal plate and said $T_A$ and said $T_B$ satisfy the equation ($T_A-10 \leq T_B \leq T_A-1$), wherein the temperatures are measured in degrees centigrade.

4. The metal-film laminate according to claim 3, wherein said resin A contains diethylene glycol in an amount of not more than 1.2% by weight, based on the weight of resin A, and a carboxylic end group in an amount of not more than 50 eq/t.

5. The metal-film laminate according to claim 3, wherein said resin A is composed of a polyethylene terephthalate-isophthalate copolymer and said resin B is composed of a polyethylene terephthalate-isophthalate copolymer.

6. The metal-film laminate according to claim 4 or 5, wherein amounts of diethylene glycol and carboxylic end group of said resin B are less than those of said resin A.

7. A can comprising the metal-film laminate defined in claim 1.

8. The metal-film laminate defined in claim 1 wherein said film is heat bonded onto said metal plate so that a maximum orientation degree of a heat-bonding side of said film is OM1 and a maximum orientation degree of a non-heat-bonding side of said film is OS1 after heat bonding;
   said metal-film laminate is drawn with ironing into a predetermined form so that the maximum orientation degree of the heat-bonding side of said film is OM2 and the maximum orientation degree of the non-heat-bonding side of said film is OS2 after forming; and
   the formed metal-film laminate is heat treated so that the maximum orientation degree of the heat-bonding side of said film is OM3 and the maximum orientation degree of the non-heat-bonding side of said film is OS3 after heat treating, and
   wherein, $0.30 \leq OM1 \leq 0.65$, $0.65 \leq OS1 \leq 1.8$, $OM1+0.02<OS1$, $0.35 \leq OM2 \leq 1.2$, $0.85 \leq OS2 \leq 2.5$, $OM2+0.05 \leq OS2$, $0.40 \leq OM3 \leq 1.6$, $1.2 \leq OS3 \leq 5.0$, $OM2+0.1 \leq OM3$, $OS2+0.2 \leq OS3$, $OM3+0.10 \leq OS3$.

* * * * *